United States Patent [19]
Ito

[11] Patent Number: 5,208,770
[45] Date of Patent: May 4, 1993

[54] ACCUMULATION CIRCUIT HAVING A ROUND-OFF FUNCTION

[75] Inventor: Akira Ito, Kawasaki, Japan

[73] Assignee: Fujitsu Limited, Kanagawa, Japan

[21] Appl. No.: 825,407

[22] Filed: Jan. 24, 1992

Related U.S. Application Data

[63] Continuation of Ser. No. 530,328, May 30, 1990, abandoned.

[30] Foreign Application Priority Data

May 30, 1989 [JP] Japan ................................. 1-136514

[51] Int. Cl.⁵ ................................................. G06F 7/50
[52] U.S. Cl. ..................................... 364/768; 364/736; 364/745
[58] Field of Search ......................... 364/768, 745, 736

[56] References Cited

U.S. PATENT DOCUMENTS

| | | | |
|---|---|---|---|
| 4,852,040 | 7/1989 | Oota | 364/768 |
| 4,945,506 | 7/1990 | Baji et al. | 364/736 |
| 5,072,418 | 12/1991 | Boutaud et al. | 364/736 X |

*Primary Examiner*—Tan V. Mai
*Attorney, Agent, or Firm*—Staas & Halsey

[57] ABSTRACT

An accumulation circuit includes an adder circuit, the output of which is stored in an accumulator (a register). A selection circuit is also provided which selectively outputs the output of the accumulator or a predetermined initial value to one of input terminals of the adder. A shifter is provided to shift bit positions of the output data of the accumulator by a predetermined number of bit positions for a rounding-off operation. Another one of the input terminals of the adder circuit is input with data to be accumulated. On beginning a new accumulation operation, the selection circuit is instructed by an initializing signal so as to select the initial value. When the round-off is not necessary, the initial value is set zero. For round-off operation, the initial value is generated by a decoder depending on a shift number output from a shift-number register, so that the initial value has a bit 1 located in ½ LSB (least significant bit) position of the rounded-off datum by the shifter as well as bits zero located in all other bit positions than the ½ LSB position. The circuit configuration allows to delete an extra clock cycle exclusively needed for the initializing, so as to enhance the accumulation speed, and a round-off circuit independently required in a prior art circuit configuration.

13 Claims, 6 Drawing Sheets

| NSF | (MSB) | | | INITIAL VALUE INI | | | (LSB) |
|---|---|---|---|---|---|---|---|
| 0 | 0 | 0 | 0 | - - - - - | 0 | 0 | 0 |
| 1 | 0 | 0 | 0 | - - - - 0 | 0 | 0 | 1 |
| 2 | 0 | 0 | 0 | - - - - 0 | 0 | 1 | 0 |
| 3 | 0 | 0 | 0 | - - - - 0 | 1 | 0 | 0 |
| ⋮ | | | | | | | |
| N | 1 | 0 | 0 | - - - - 0 | 0 | 0 | 0 |

N BITS

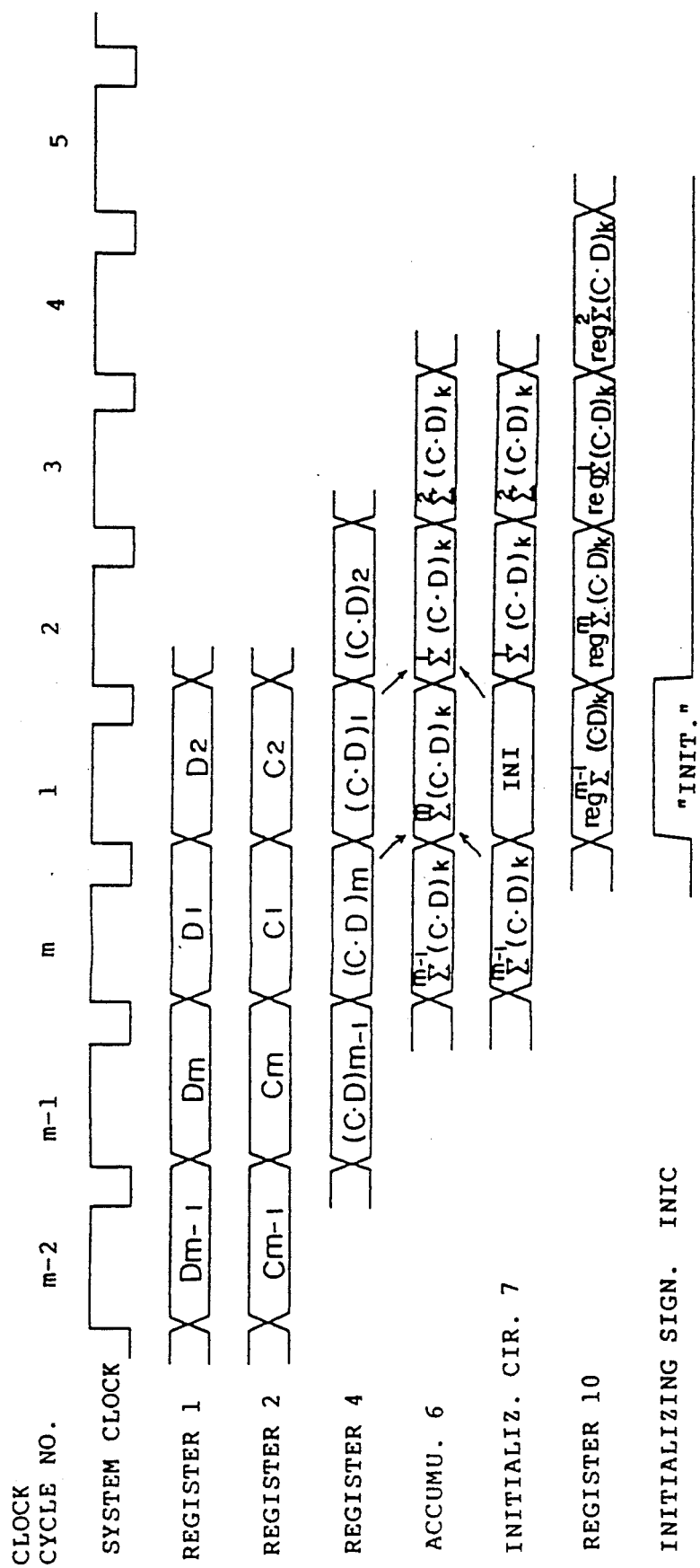

& # 35;,208,770

ACCUMULATION CIRCUIT HAVING A ROUND-OFF FUNCTION

This application is a continuation of application Ser. No. 07/530,328, filed May 30, 1990, now abandoned.

BACKGROUND OF THE INVENTION

1. Field of the Invention

The present invention relates to an arithmetic operation circuit for conducting multiplication and accumulation.

2. Description of the Related Art

An accumulation circuit has been employed for, a, multiplication and accumulation process, for example, between pixel blocks in an image signal processor, or in an orthogonal transformation, such as DCT (Discrete Cosine Transformation). In the image signal processing example, there is required an accumulated sum operation for matching a block having n×n (n=4, 8, . . . ) pixels with a predetermined reference block for motion compensation. Or in the DCT processing example, there is required a multiplication and accumulation process with an n×n pixel block and a predetermined coefficient.

A prior art operation circuit for executing an accumulation operation is shown in FIG. 1. In this figure, a multiplicand (an image data) D and a constant C are stored in register 1 and register 2 respectively. C and D are multiplied by a multiplier 3 in the next clock cycle so that a multiplied product C×D is stored in a register 4. Next, the value C×D of this register 4 is added to an accumulated sum (C D) stored in an accumulator (register) 61 by an adder 5, then the summed result Σ(C·D) is stored again in the accumulator 61. Namely, the following operation is carried out.

$$\sum_{K}^{j-1} (C \cdot D)_K + (C \cdot D)_j \rightarrow \sum_{K}^{j} (C \cdot D)_K$$

This operation is carried out during each clock cycle for each of the pixels of the pixel block consisting of n×n pixels, so that the accumulated sum described below, is finally obtained.

$$\sum_{k=1}^{n^2} (C \cdot D)_K$$

This accumulated sum is further input to a shifter 8 and data having a predetermined word length is shifted therein a predetermined number of times based on a predetermined bit number preset in a shift number setting register 9. The data is output to a round-off circuit 11 in which it is (typically, rounded off by adding 1 to the ½ LSB (least significant bit)). The ½ least significant bit is the bit adjacent to and less significant than the least significant bit. Thereafter, the result thereof is stored in a register 10. Operation timings of this prior art circuit are shown in the timing charts in FIG. 2. In this figure, the notation "X" indicates data which is not particularly specified. The notation φ indicates zero. Cycle number "m" is equal to n² in this case. As should be understood from this figure, the accumulated sum of a certain pixel block stored in the accumulated 61 must be cleared in accordance with a CLEAR signal CLRC before processing the next pixel block. A single clock cycle for clearing the contents of the accumulator 61 is required in addition to the cycles for the accumulation process.

Therefore, continuity of the accumulation operation is lost. The extra time required for that one cycle lowers the operation speed. Moreover, a circuit is required for interrupting the image signal input to the operation circuit during the clear cycle.

Also, for rounding off the accumulating operation result, the round-off circuit 11 must be provided as an independently additional hardware. Round-off circuit 11, which usually includes an adder circuit, causes a problem in that the circuit configuration becomes large.

SUMMARY OF THE INVENTION

It is a general object of the invention to provide an accumulation circuit achieving a simpler and smaller circuit configuration.

It is another object of the invention to provide an accumulation circuit achieving a fast operation.

The accumulation circuit according to the present invention comprises an adder circuit, the output of which is stored in an accumulator (a register),; and a selection circuit which selectively outputs either the output of the accumulator or a predetermined initial value to one of the input terminals of the adder. Another one of the input terminals of the adder circuit is input with data to be accumulated. On beginning a new accumulation operation, the selection circuit is instructed by an initializing signal so as to select the initial value. The initial value is preset as zero for a simple accumulation, (one without a rounding-off operation). This circuit configuration requires one less a clock cycle for the initialization, so as to enhance the accumulation operation. Also, a circuit is no longer required for interrupting the data input to the adder. Data output from the accumulator may be also input to a shifter, where the data from the accumulator is shifted by a predetermined number of bit positions for a rounding-off operation. For the rounding-off operation, the initial value is determined by a decoder depending on a shift number output from a shift-number register. The initial value has a bit "1" located at ½ LSB bit position of the rounded-off data by the shifter, and all other bit positions are zero. With this circuit configuration, a rounding-off circuit is no longer required as in the prior art circuit configuration.

The above-mentioned features and advantages of the present invention, together with other objects and advantages which will become apparent, will be more fully described hereinafter. Reference will be made to the accompanying drawings which form a part hereof, wherein like numerals refer to like parts throughout.

BRIEF DESCRIPTION OF THE DRAWINGS

FIG. 7 is a time chart indicating the operation timings of the preferred embodiment circuit.

DETAILED DESCRIPTION OF THE PREFERRED EMBODIMENT

Figure 3:
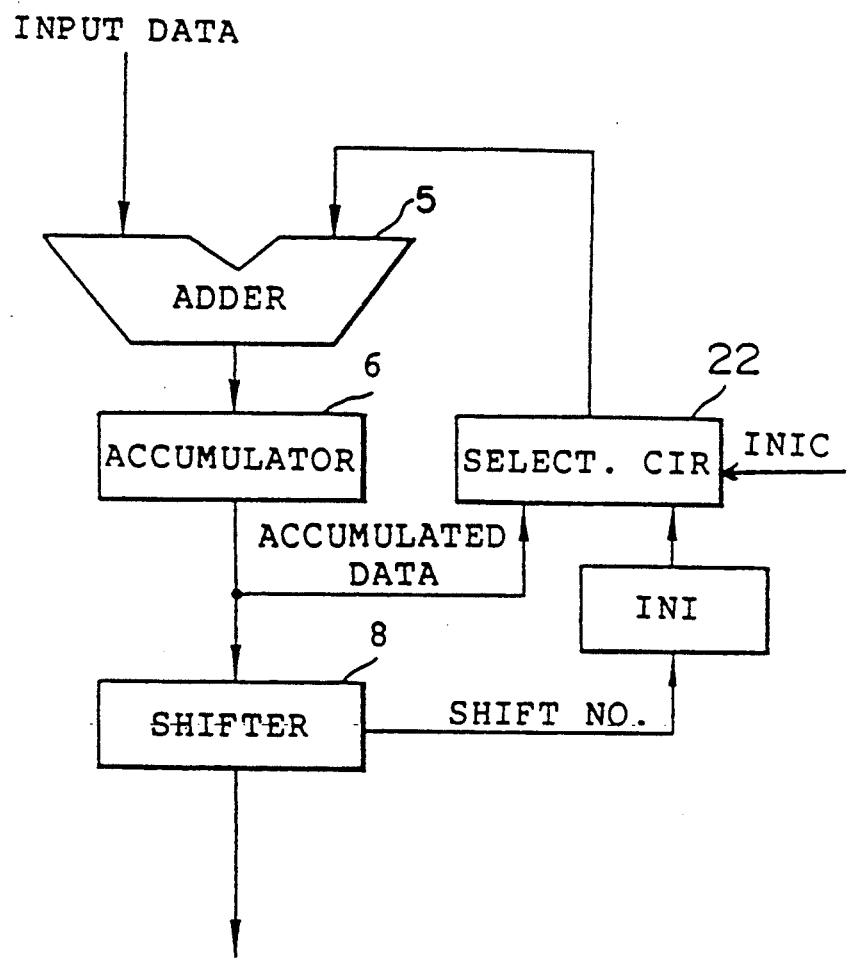
FIG. 3 is a block diagram for explaining the principle of the present invention.

FIG. 3 is a principle block diagram of an accumulation circuit of the present invention. A selection circuit 22 selects and outputs either an accumulated value output from an accumulator 6 formed with a register 1, or a predetermined initial value INI. An adder 5 sums an input value (referred to hereinafter as an input data) into the accumulation circuit and the output of selection circuit 22, and stores the summed result. The selection circuit 22 first selects the initial value instead of the accumulated data from the adder 5, in response to an initialization signal which is input thereto, and then outputs the initial value to the adder 5.

There is also provided a shifter 8 for shifting the bit position of the accumulated data stored in the accumulator 6. The initial value INI selected by the selection circuit 22 is such that, according to the shift number in the shifter 8, bit "1" is located at a bit position where "1" is to be added for the rounding-off operation, in other words, "1" is located at ½ LSB position of the rounded-off data. Therefore, in a case where the data is to be rounded off as an integer, the bit "1" is located at the next lower bit position of the decimal point while all other bit positions are of "0".

For obtaining the accumulated sum of a single accumulating operation cycle, i.e. of a single pixel block, first an initialization signal INIC is input to the selection circuit 22 on the first clock cycle of the accumulating operation, so that the selection circuit 22 selectively outputs the initial value to the adder 5. The adder 5 sum the initial value (usually zero in a case where a data shift is not carried out by shifter 8) and the input data, the summed result is stored in the accumulator 6. In the successive clock cycles, the selection circuit 22 selects the accumulated data Σ output from the accumulator 6, so that the adder 6 sums the accumulated value (now denoted with Σ' in FIG. 4) output from the selection circuit 22 and the input data $(C \cdot D)_k$ input on each clock cycle.

Figure 1:
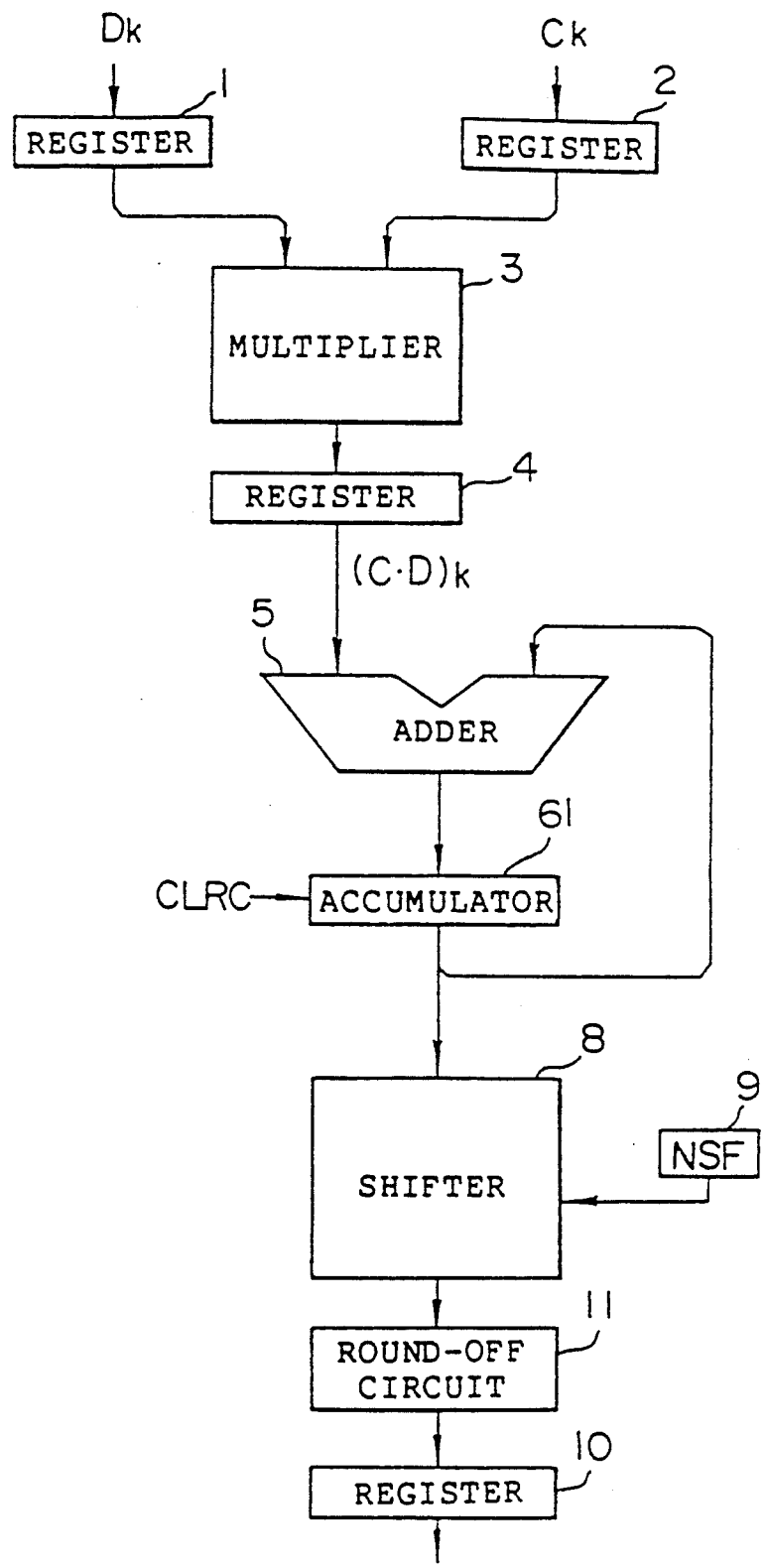
FIG. 1 is a block diagram of a prior art arithmetic operation circuit.
Figure 2:
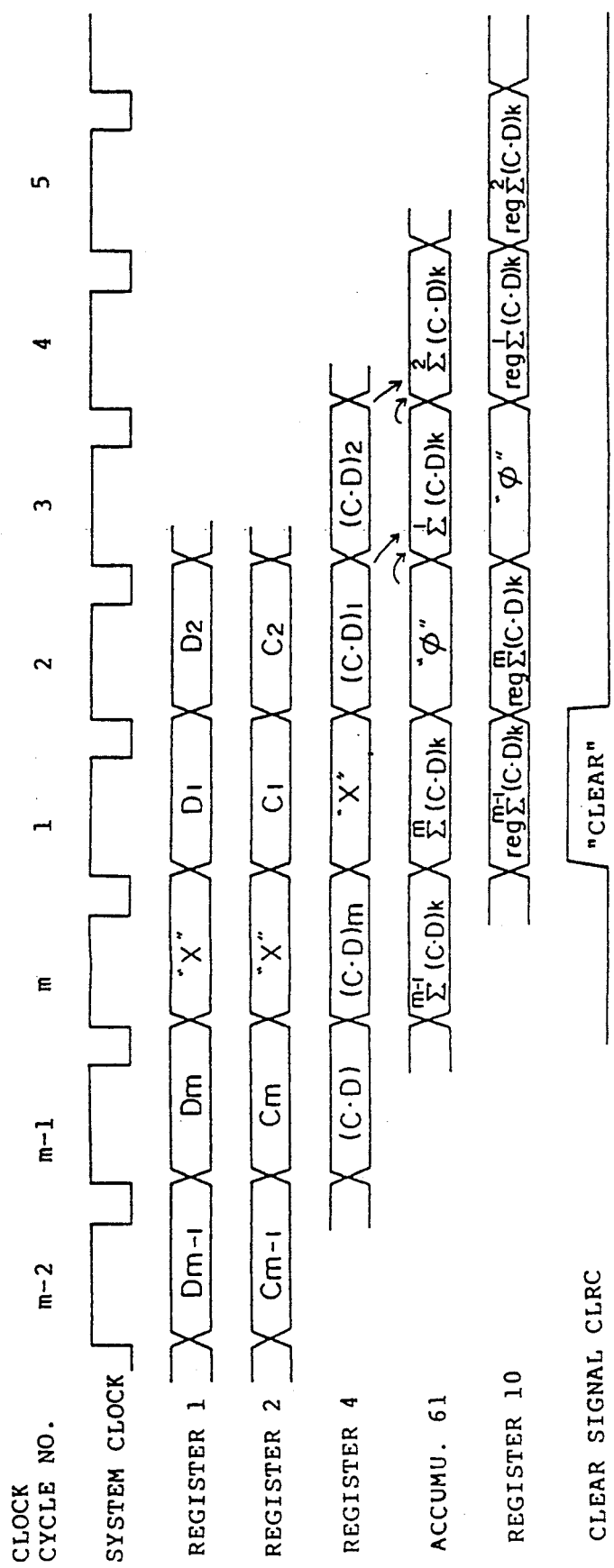
FIG. 2 is a time chart showing operation timings of the prior art circuit.
Figure 4:
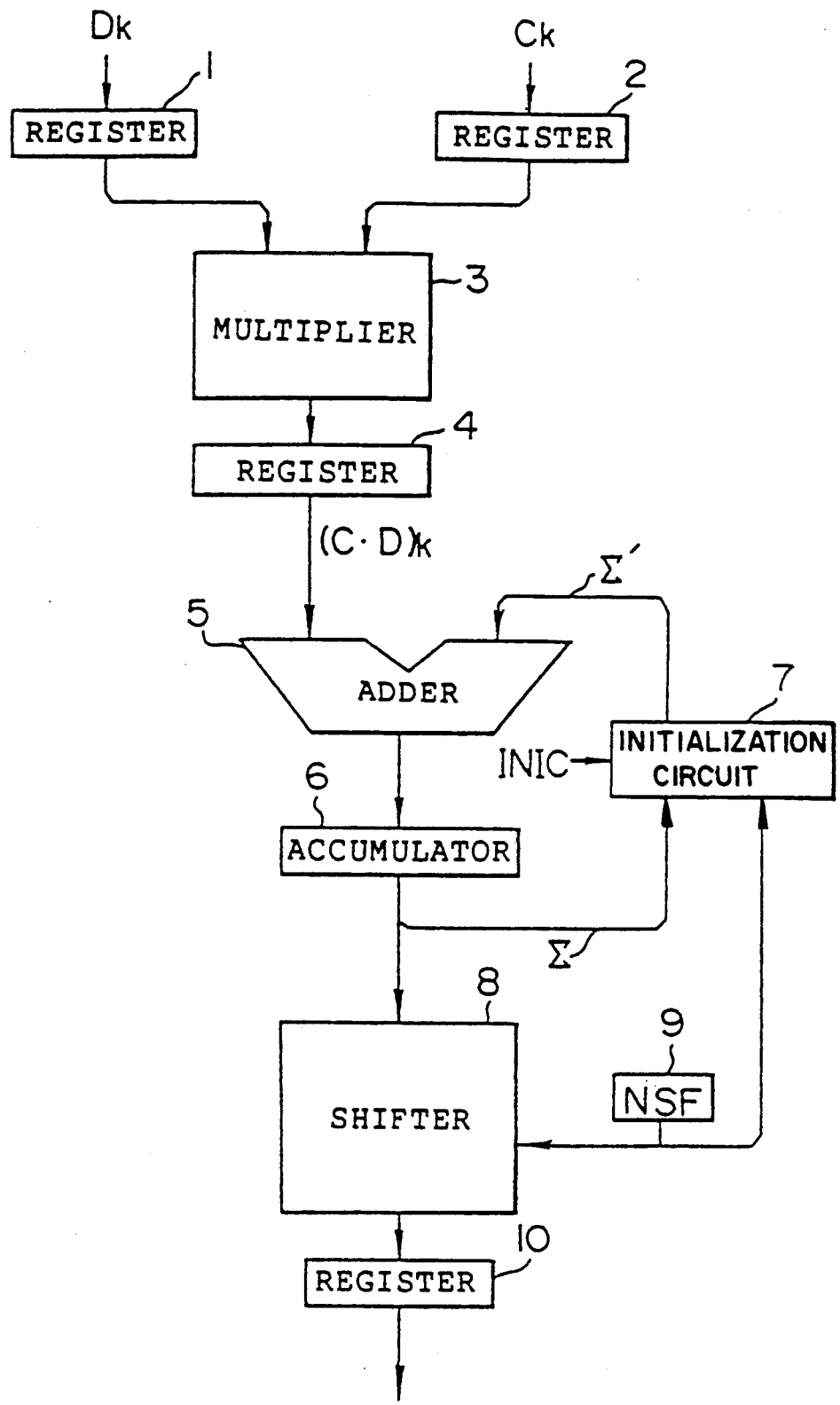
FIG. 4 is a block diagram of an accumulation circuit as a preferred embodiment of the present invention.

FIG. 4 is a preferred embodiment of the accumulation circuit of the present invention. In this figure, circuit elements having the same function as those in the accumulation circuit of the FIG. 1 prior art and the FIG. 3 principle diagram are designated with the same reference numerals. The accumulator 6 of the preferred embodiment does not require a "CLEAR" function. Therefore, the initialization circuit 7 is provided as the selection circuit 22 of FIG. 3, so that the accumulated data Σ $(C \cdot D)_k$ from the accumulator 6 is input to the adder 5 via the initialization circuit 7. The number of positions to be shifted in the shifter 8 (referred to hereinafter as a shift number) NSF has been preset in a shift-number register 9 and is input to this initialization circuit 7 from the shift number register 9. Moreover, this preferred embodiment circuit does not require a round-off circuit 11 a is needed in the FIG. 1 prior art circuit.

Figures 5, 6:
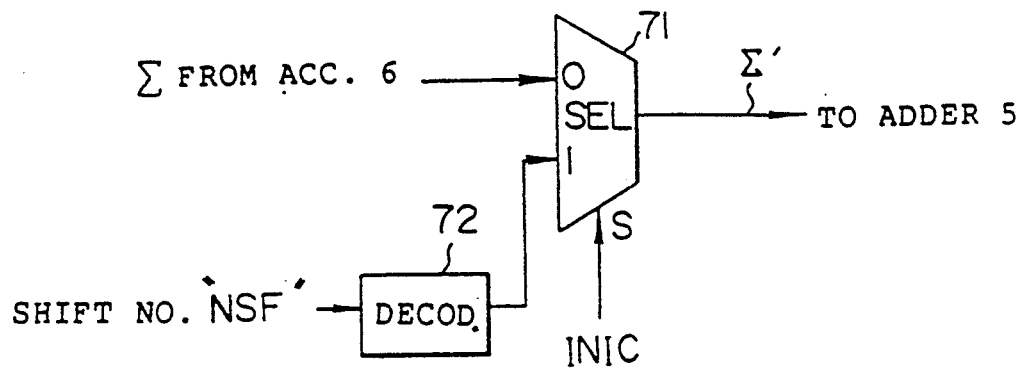
FIG. 5 is a block diagram of an initialization circuit in the preferred embodiment circuit of the present invention.
FIG. 6 is an initial value setting table in the initialization circuit.

Further detail of the initialization circuit 7 is shown in FIG. 5. The initialization circuit 7 comprises a selector 71 and a decoder 72. Generally, the selector 71 selectively outputs the accumulated value Σ sent from the accumulator 6. However, the selector 71 selectively outputs an initial value INI sent from the decoder 72 when the initialization signal INIC is input thereto. The initial value INI is generated in the decoder 72 by decoding the shift number installed in the shift-number register 9 according to a look-up table shown in FIG. 6.

The look-up table in FIG. 6 indicates the relationship between the input shift number NSF and the output initial value INI. Thus, when the data is not to be shifted, that is, when the shift number NSF is zero, the initial value INI is also zero. However, when the data is to be shifted right by a single bit in the shifter 8, only the LSB position of the initial value INI is "1" while all the other bit positions are zero. When the shift number is S, only the S-th bit position from the LSB is "1" while all the others bits are zero.

Operations of the embodiment circuit of FIG. 4 will then be explained by referring to the timing chart of FIG. 7. Data D, and C, respectively set in the registers 1 and 2 in the final operation cycle "m" of the previous pixel block are multiplied by the multiplier 3 in the first clock cycle 1 of the new pixel block, then the multiplication result (C·D), is stored in the register 4. In the accumulator 6 there is stored the finally accumulated sum $$\sum_{}^{m} (C \cdot D)_K$$

of the previous clock cycle "m". The numeral "m" also indicates the quantity of pixels, n×n, in a single pixel block. On the first clock cycle 1, the initialization signal INIC is input to the initialization circuit 7. Thereby, in the initialization circuit 7, i.e. the selector 71, selects the initial value INI sent from the decoder 72 and outputs it to the adder 5. As shown in FIG. 6, this initial value INI depends on the shift number NSF. However, it is now assumed that the number of shifts is zero, accordingly the initial value INI is also zero. Therefore, the signals 0 and (C·D), are input to the adder 5, so that they are summed on the next cycle 2. Then, $$\sum_{}^{l} (C \cdot D)_K$$

is stored in the accumulator 6. On and after the second clock cycle 2, the initialization clock is disabled; accordingly, the initialization circuit 7 selects the accumulated sum Σ, which is then input to the adder 5. This operation is sequentially repeated on each clock cycle so as to obtain the accumulated summation. This operation does not require the extra single clock cycle required for clearing the content of accumulator 5. Accordingly, continuity of the operation can be attained. Namely, data sent from a frame memory for storing the image information can be continuously read out. Accordingly, a control circuit, which has been necessary in the prior art configuration to obtain the CLEAR period, can be eliminated so as to simplify the circuit configuration. Moreover, for example, when n=4, that is, when a single pixel block consists of 16 pixels, the 17 clock cycles used for processing the single pixel block can be reduced to 16 clock cycles. Thus, a higher speed operation can be realized.

Apart from the above-mentioned assumption, in the case where the bit shift is carried out in the shifter 8 in order to make the accumulated sum a predetermined word length, the shift number NSF installed in the shift number setting register 9 is sent also to the initialization circuit 7, so that the initial value INI in accordance with FIG. 6 is input to the adder 5 on cycle "1" of the accumulation operation, and is then added to the multiplied product (C·D), in cycle "2". Thereby, the adding operation for the rounding-off, which must be conducted after the final result is obtained in the prior art circuit configuration, can be conducted by the adder 5 in cycle 1. Accordingly, prior art hardware provided only for the round-off processing circuit 11 can be eliminated. In the preferred embodiments shown in FIG. 4 and FIG. 5, the selector 71 and the decoder 72 are additionally necessary for the round-off processing; however, their circuit configuration can be remarkably reduced in size in comparison with the prior art round-off circuit 11 which requires a relatively complicated adder circuit therein. As a result, the elimination of the round-off circuit has contributed to a reduction in circuit size down to about 80%.

Though in the above description the numerals 1 and zero are referred to represent logics "1" and "0" respectively, it should be apparent that the concept of the present invention can be employed in a negative logic where the numerals 1 and zero represent the logics "0" and "1", respectively.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications and equivalents may be resorted to, falling within the scope of the invention.

What I claim is:

1. An accumulation circuit for accumulating input data, comprising:
    an accumulator storing accumulated data using accumulation cycles;
    a selection circuit, operatively connected to said accumulator, and selectively outputting one of the accumulated data and an initial value, said selection circuit selecting the initial value when an initialization signal is input thereto during a first accumulation cycle to produce an output;
    an adder, operatively connected to said accumulator and said selection circuit, for summing the input data and the output of said selection circuit, and outputting a result to said accumulator; and
    a shifter, operatively connected to said accumulator, shifting-right bit positions of the accumulated data by a predetermined shift number, input to said shifter, for rounding off the accumulated data to obtain rounded-off data, the initial value representing the predetermined shift number and having logic "1" in a ½ LSB position of the rounded-off data and logic "0" in all bit positions other than the ½ LSB position.

2. An accumulation circuit as recited in claim 1, further comprising:
    a shift number register for storing the shift number; and
    a decoder for decoding the shift number to generate said initial value.

3. An accumulation circuit for accumulating input data, comprising:
    an adder adding the input data to selected data to obtain added data;
    an accumulator operatively connected to said adder and accumulating the added data to obtain accumulated data using accumulation cycles;
    a selection circuit, operatively connected to said accumulator and said adder, selecting and outputting one of the accumulated data and an initial value representing a predetermined shift number for rounding off the accumulated data, as the selected data to said adder.

4. An accumulation circuit as recited in claim 3, wherein said selection circuit selects the initial value and outputs the initial value as the selected data when said selection circuit receives an initialization signal as input during a first accumulation cycle.

5. An accumulation circuit as recited in claim 4, further comprising:
    a shift number register, operatively connected to said selection circuit and storing a shift number; and
    a shifter circuit, operatively connected to said accumulator and said shift number register, and shifting the accumulated data based on the shift number, and
    wherein said selection circuit further comprises a decoder decoding the shift number to generate the initial value.

6. A method of accumulating input data in an accumulation circuit having an adder for adding the accumulated data to selected data, and an accumulator, using accumulation cycles, for accumulating the results from the adder as accumulated data, comprising the steps of:
    (a) selecting either the accumulated data or an initial value representing a predetermined shift number for rounding off the accumulated data as the selected data; and
    (b) outputting the selected data to the adder.

7. A method as recited in claim 6, wherein said selecting in step (a) selects the initial value upon receiving an initialization signal at a first accumulation cycle.

8. A method as recited in claim 7, further comprising the steps of:
    (c) storing a shift number;
    (d) shifting the accumulated data a number of bits indicated by the shift number; and
    (e) decoding the shift number to generate the initial value.

9. A method of accumulating input data in an accumulation circuit, comprising the steps of:
    (a) selecting an initial value representing a predetermined shift number for rounding off accumulated data in an initial cycle;
    (b) adding the initial value to a first input value in the initial cycle to produce an accumulated value; and
    (c) adding a second input value to the accumulated value.

10. A method as recited in claim 7, wherein the initial value is a roundoff value indicating a number of bits to shift the accumulated data.

11. A method as recited in claim 10, further comprising the step (d) of shifting the accumulated value by the predetermined shift number.

12. A method as recited in claim 11, wherein step (a) includes selecting the roundoff value responsive to the predetermined shift number.

13. An accumulation circuit for accumulating input data, comprising:
    an accumulator storing accumulated data;
    a selection circuit, operatively connected to said accumulator, and selectively outputting one of the accumulated data and a predetermined initial value, said selection circuit selecting the initial value when an initialization signal is input thereto;

an adder, operatively connected to said accumulator and said selection circuit, and summing the input data and an output of said selection circuit, and outputting a result to said accumulator;

a shifter, operatively connected to said accumulator, shifting-right bit positions of the accumulated data by a predetermined shift number, input to said shifter, for rounding off said accumulated data to obtain rounded-off data;

the initial value representing said predetermined shift number, and having logic "1" in a ½ LSB position of the rounded-off data and has logic "0" in all bit positions other than said ½ LSB position;

a shift number register for storing the predetermined shift number; and a decoder for decoding the shift number to generate said initial value.

* * * * *

UNITED STATES PATENT AND TRADEMARK OFFICE
CERTIFICATE OF CORRECTION

PATENT NO. : 5,208,770
DATED : May 4, 1993
INVENTOR(S) : Akiro ITO

It is certified that error appears in the above-indentified patent and that said Letters Patent is hereby corrected as shown below:

On the Title Page, Item [73], "Kanagawa" should be --Kawasaki--.

Col. 1, line 55, delete "The ½ least significant";
line 56, delete in its entirety;
line 57, delete "significant bit.";
line 64, "accumulated" should be --accumulator--.

Col. 2, line 20, delete ";".

Col. 3, line 58, "a" should be --as--.

Col. 5, line 16, after "to" insert --to--.

Signed and Sealed this

Thirty-first Day of May, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,208,770
DATED : May 4, 1993
INVENTOR(S) : ITO

It is certified that error appears in the above-indentified patent and that said Letters Patent is hereby corrected as shown below:

TITLE PAGE: [73] Assignee:

Please change "Kanagawa" to --Kawasaki--.

Signed and Sealed this

Third Day of January, 1995

*Attest:*

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,208,770
DATED : May 4, 1993
INVENTOR(S) : ITO

It is certified that error appears in the above-indentified patent and that said Letters Patent is hereby corrected as shown below:

TITLE PAGE: [73] Assignee:

Please change "Kanagawa" to --Kawasaki--.

Signed and Sealed this

Twenty-first Day of February, 1995

Attest:

BRUCE LEHMAN

Attesting Officer     *Commissioner of Patents and Trademarks*